Sept. 13, 1960

E. T. STROM 2,952,477

RESILIENT HITCH

Filed March 24, 1958

INVENTOR
EDGAR T. STROM

Stuart R. Peterson
Attorney

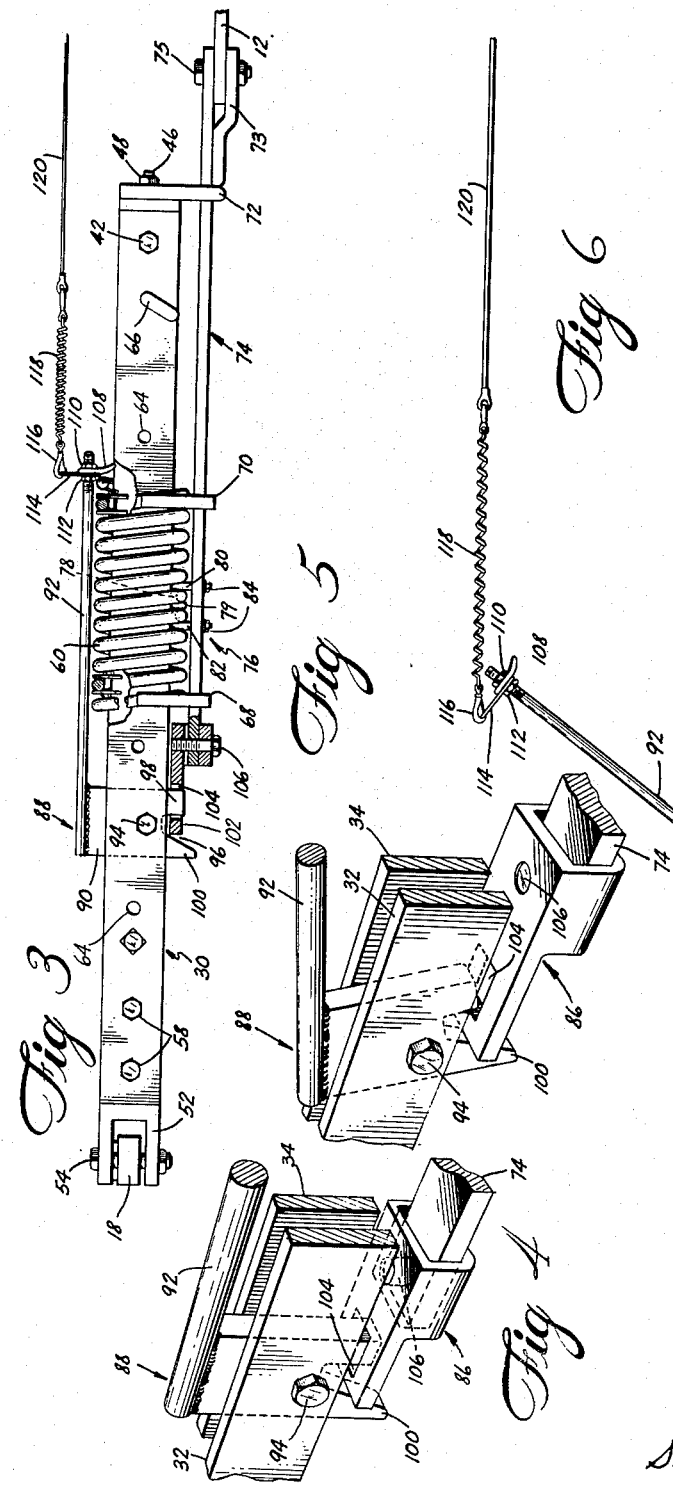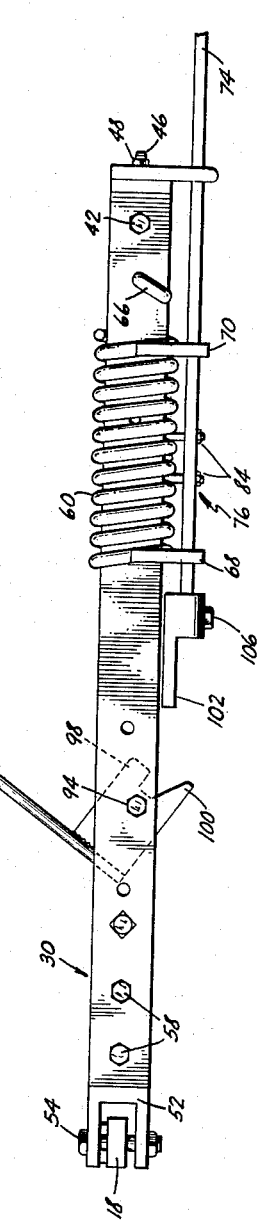
Sept. 13, 1960
E. T. STROM
RESILIENT HITCH
2,952,477
Filed March 24, 1958
3 Sheets-Sheet 2
INVENTOR
EDGAR T. STROM
Stuart R. Peterson
Attorney Sept. 13, 1960  E. T. STROM  2,952,477
RESILIENT HITCH
Filed March 24, 1958  3 Sheets-Sheet 3
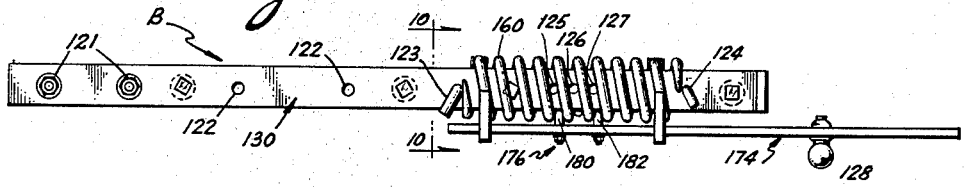
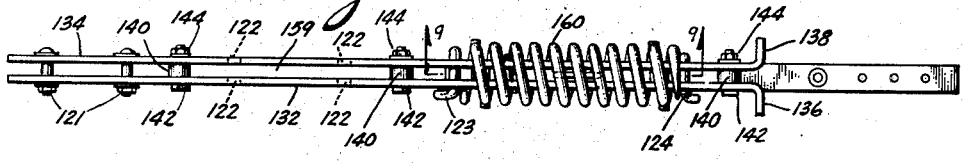
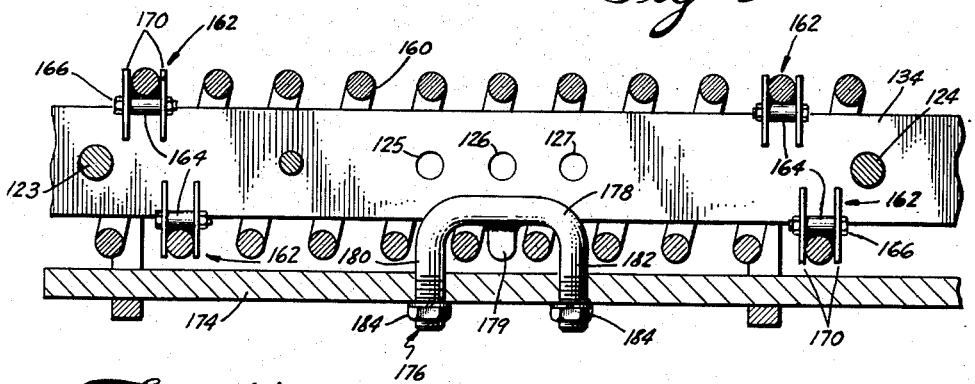
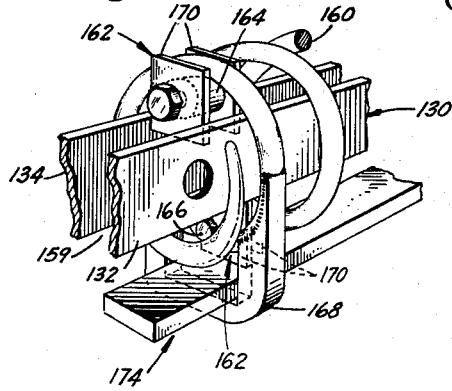
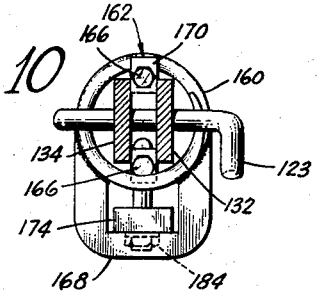
INVENTOR
EDGAR T. STROM
Stuart R. Peterson
Attorney

United States Patent Office 2,952,477
Patented Sept. 13, 1960

2,952,477

RESILIENT HITCH

Edgar T. Strom, Beulah, N. Dak.

Filed Mar. 24, 1958, Ser. No. 723,392

12 Claims. (Cl. 280—487)

This invention relates generally to hitches by which vehicles, farm implements, earthmoving equipment and the like may be towed, and pertains more particularly to a hitch construction having certain resilient characteristics that render the hitch adaptable to a variety of needs.

It is not new to employ resilient hitches having various capabilities. For instance, a number of resilient or spring hitches have been devised for carrying out farming operations where a tractor-pulled plow is bound to encounter obstacles or obstructions of various sorts, the yielding characteristics of such hitches minimizing the sudden shocks and strains that would otherwise occur. Also, resilient hitches have been devised which will permit a yieldable reverse movement of the plow when the tractor is backed up.

The objections to the resilient hitches that have come to my attention are largely three-fold: (1) they are costly to manufacture, (2) they are difficult to adjust, and (3) they are likely to break when subjected to exceptionally hard usage.

Accordingly, one object of the invention is to provide a resilient hitch that is economical to manufacture, being constructed of a relatively few parts that are easily fabricated.

Another object of the invention is to provide a resilient hitch in which the degree of resiliency can be readily adjusted. More specifically, it is planned that only a single coil spring be employed and that such spring be positionable so that a preferred number of turns or convolutions be made available for shouldering either a forward pull or a backward push depending upon anticipated conditions. Also, it is an aim of the invention to effect quickly a solid connection for either a fore or aft, or both, movement when circumstances so dictate. With regard to the last-mentioned feature, it may be stated that this feature is realized by the appropriate insertion of a load transmitting pin between the draft members in a manner such that the load is transmitted via certain coils of the spring.

A further object is to employ a U-shaped element for attaching one draft member to the coil spring and a cooperable draft unit provided with a longitudinal slot for slidably receiving said U-shaped element in a manner to assist in the guiding of the draft members in a rectilinear direction relative to each other.

Still another object of the invention is to provide spacing elements acting in concert with the U-shaped element referred to above that may be readily replaced when they become worn or damaged.

Yet another object of the invention is to provide a trip release of the spring from a given position upon a predetermined overload occurring, the release causing a clutch disengagement of the towing vehicle, if such disengagement is desired. Also, it is within the contemplation of the invention to arrest the spring movement after a prescribed travel thereof so that it again becomes available for shock absorbing purposes should the tractor or towing vehicle still be coasting after the alluded to clutch disengagement has been achieved.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 3 is an enlarged side elevational view of the hitch as it appears in Figure 1, certain portions of the hitch being broken away and other portions being in section in order to illustrate the constructional make-up of this embodiment;

Figure 4 is a fragmentary detail in perspective of a portion of the hitch, the parts being in the same pre-release position depicted in Figure 3;

Figure 5 is a view generally similar to Figure 4 but showing the hitch in the process of being tripped;

Figure 6 is a view corresponding to Figure 3 but depicting the hitch in a fully released condition;

Figure 7 is a side elevational view of a somewhat simpler hitch, the tripping or release feature included in the embodiment of Figure 1 having been omitted;

Figure 8 is a plan view of Figure 7;

Figure 9 is an enlarged sectional view taken in the direction of line 9—9 of Figure 8, the view depicting the locations of four spacer assemblies fixedly anchored to the coil spring and slidable relative the draft members constituting the upper draft unit;

Figure 10 is a sectional view taken in the direction of line 10—10, and

Figure 11 is another fragmentary detail in perspective, the view omitting the L-shaped pin of Figure 10.

Figure 1:
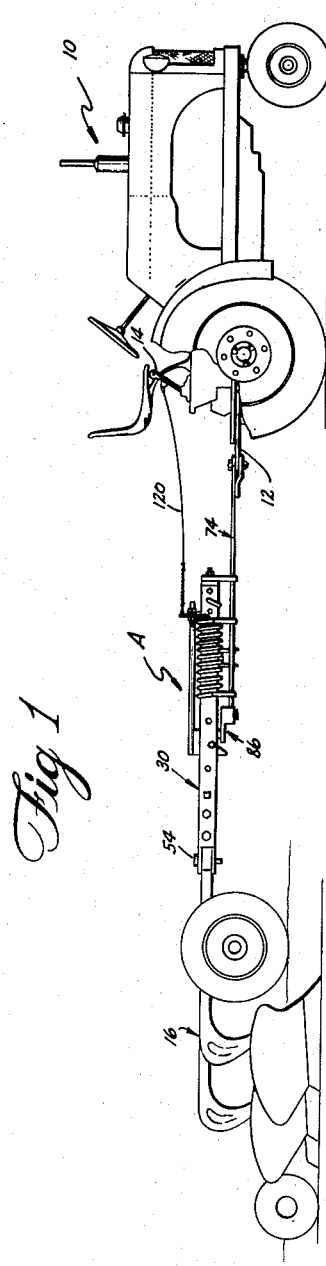
Figure 1 is a side elevational view illustrating one form my invention may assume, the view showing the forward end of the hitch as it might be connected to a tractor and the rear end as it might be connected to a plow.
Figure 2:
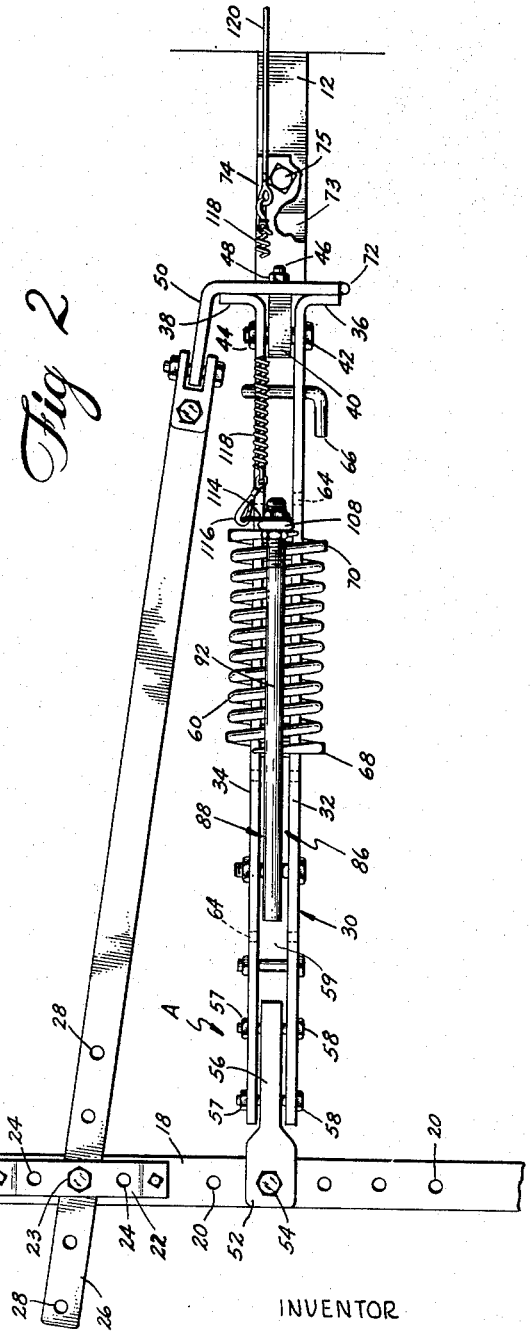
Figure 2 is a plan view corresponding to Figure 1, the view showing the manner in which the trailing of the plow is controlled when using my hitch.

Referring now in detail to the drawings and first to the embodiment pictured in Figure 1, it will be observed that this hitch has been designated in its entirety by the letter A. For the purpose of illustrating a particular use of the hitch A the forward end thereof has been designed for attachment to the rear of a tractor 10. As is conventional, the tractor 10 is equipped with a rearwardly directed, apertured drawbar 12 and a declutching lever 14. More will be said hereinafter concerning the role that the lever 14 plays when using this particular hitch embodiment.

The aft end of the hitch A is suitably coupled to the forward end of a plow 16 in the exemplified situation. As is customary with this type of plow, it is provided with a cross beam 18 having a plurality of apertures 20. Offset from the apertures 20 is a fixed bracket 22, its raised central portion having several apertures 24 aligned with further apertures (not visible) in the cross beam 18. Adjustably connected by a pin 23 at one end to the bracket 22 and the beam 18 is a control arm 26, the arm 26 containing a number of apertures 28 by which the furrowing of the trailing plow 16 may be governed. More will be said presently with regard to the forward end of the arm 26 and its attachment to the hitch A.

The hitch A comprises what will be termed a first draft unit 30. This draft unit 30 is composed of a pair of elongated draft members 32, 34 having their forward ends outturned so as to provide flanges or ears 36, 38. Between the forward ends of the members 32, 34 is a spacer element 40 held in place by a bolt 42 and nut 44. The spacer 40 has welded thereto a forwardly projecting stud 46 upon which is threaded a nut 48, the stud passing first through an angled extension 50 mounted on the forward end of the control arm 26 in a swivel-like fashion. The particular connection or mounting of the extension 50 to the arm 26 will depend largely upon the make of plow 16, and since it forms no part of the instant invention further description is believed unnecessary.

A clevis 52 through which a pin 54 can pass is used for attaching the draft unit 30 to the cross beam 18, the clevis having a forwardly projecting tongue 56 which is anchored between the draft members 32, 34 by means of a pair of bolts 57 and nuts 58. In this way the tongue 56 can be made to serve as a rear spacer for the members 32, 34. Owing to the parallel spacing of the members 32 and 34, it will be understood that a longitudinal slot 59 is, in effect, formed in the draft unit 30.

Freely encircling the members 32, 34 of the draft unit 30 is a coil spring 60 having any desired number of coils or convolutions. Through the assistance of four spacer assemblies 62 the spring is guided in a rectilinear path along the draft unit 30. Inasmuch as identical spacers 162 are contemplated in connection with the embodiment B yet to be described, a more detailed analysis of these spacers is believed better reserved for subsequent description where more detailed views will be referred to.

Upon release of the spring 60 in a manner hereinafter made clearer the spring may move to the extreme forward end of the draft unit 30, then abutting or striking the laterally projecting ears 36, 38 which serve as stops. However, provision is made for arresting the movement of the spring prior to this extreme travel termination. In accomplishing this aim, the draft members 32, 34 are formed with aligned transverse apertures 64 at preferred intervals. As a general rule these apertures will be located at points equal to one-half the axial length of the spring 60, but such hole spacing is discretionary with the manufacturer, or for that matter the location of these apertures can be left up to the purchaser of the hitch. At any rate, in the illustrated situation a transverse pin 66 has been inserted in those apertures 64 nearest the ears 36, 38. Consequently, motion of the spring will be halted in advance of its reaching the extreme forward end of the draft unit 30.

It will be observed that both ends of the spring 60 are provided with loop or sling portions 68, 70. Likewise the ears 36, 38 have a loop or sling portion 72 secured thereto.

Extending through the eyes or openings formed by the loop or sling portions 68, 70 and 72 is a second draft unit 74; this unit ("unit" being used for the sake of language uniformity) constitutes only a single draft member in contradistinction to the two side by side members constituting the unit 30. The second draft unit 74 is equipped with a clevis end 73 by which it can be attached to the drawbar 12 through the agency of a pin 75. The draft unit 74 is made fast to the coil spring 60 by way of a U-shaped bolt element 76. The bight portion 78 of the bolt 76 straddles two spring convolutions, having a downwardly intervening lug 79 between these adjacent coils, and the leg portions 80, 82 project downwardly through spaced apertures in the draft member or unit 74. Nuts 84 threaded onto the ends of the legs 80, 82 assure a rigid retention of this second draft unit to the spring 60 so as to be movable in unison with the spring. It will be understood that the bight portion 78 of the U-bolt extends upwardly into the space or slot 59 provided in the first draft unit 30, and in this way aids in the rectilinear guidance of the spring 60, the spacer assemblies 62 also helping in this regard as already explained. Further assistance in this respect is supplied by the loop or sling portion 72, especially where the draft unit 74 is of appreciable length because this second draft unit moves with the spring 60.

Next to be described in conjunction with the present embodiment A is a latch mechanism indicated generally by the reference numeral 86. When experiencing normal loads, the latch mechanism 86 retains the spring 60 in the position depicted in Figure 3. In the accomplishment of this objective, the latch mechanism includes an L-shaped, pivotal hasp member 88 having a flange portion 90 and a rod portion 92. The flange portion 90 is apertured for the accommodation of a transverse pin 94, the pin being journaled in the two spaced draft members 32 and 34 so as to provide the pivotal action abovementioned. The lower edge of the flange 90 is notched at 96 so as to form a pair of downwardly projecting fingers 98 and 100.

The second draft unit 74 carries at one end a clevis element 102 having an aperture 104 at one end into which the finger 98 normally projects. The other end of the clevis 102 is suitably shaped so as to be attached to said draft unit 74, a bolt 106 here being used as the means of attachment. It will be noted that the moment arm, that is, the distance from the pin 94 to the locus of engagement of the clevis 102 with the finger 98, is quite short. The reason for this will soon become manifest.

Focusing attention now on the rod 92, it will be seen that this rod carries adjacent its free end a friction catch or dog 108 which will normally be in pressural engagement with one of the spacer assemblies 62. Retaining the catch or dog 108 in preferred position on the threaded end of the rod is a pair of nuts 110 and 112, there also being an upstanding lug 114 sandwiched therebetween with said dog. A thimble 116 is looped through the upper apertured end of the lug 114, the thimble being attached to one end of a section of a spring 118. The other end of the spring 118 is secured to a length of rope or cable 120 leading to the upper end of the previously mentioned declutching lever 14 on the tractor 10.

As for the operation and functioning of embodiment A, it is felt that the foregoing description will be entirely adequate in this regard. However, a brief description concerned specifically with the operation may be of help. Accordingly, we will assume that the plow 16 is experiencing only normal resistance to its advancement. Hence, the tractor 10 will be exerting a pull on the lower draft unit 74. The towing force of the tractor is transmitted through this second draft unit 74 to the first draft unit 30 over two paths: (1) through the clevis 102 via the flange 90 of the hasp member 88 and then through the pin 94, and (2) through the U-shaped bolt 76, those coils of the spring 60 ahead of the U-shaped bolt, the dog 108, the rod portion 92 of the hasp member 88 and the flange 90 to the draft unit 30 via the pin 94. However, when a rock, root or other obstruction is encountered by the plow 16, it can be seen that the hasp member 88 will be urged in a counter-clockwise direction by the increased tensional load imposed on the draft unit 74. As already stated, the moment arm is rather short, thereby necessitating the occurrence of an appreciable load in order to produce the counter-clockwise rotation or pivoting of the hasp member 88.

In any event, when such forces reach the prescribed magnitude, the hasp member 88 pivots upwardly, the beginning of such an occurrence being shown in Figure 5, whereas Figure 4 is indicative of the pre-release disposition of the parts. Of course, the tripping force can be adjusted to various values by advancing or backing off the nuts 110, 112. The greater the advancing pressure against the dog, the greater the needed release force becomes.

Immediately upon the release of the dog 108 the hasp member 88 literally flies upwardly into the position pictured in Figure 6, thus yanking the cable 120 rearwardly so as to pull the declutching lever 14 into its disengaged position. The comparatively weak spring 118 is instrumental in allowing the tractor 10 to coast ahead if necessary, this spring easily stretching to permit this.

Concurrently with this happening, the spring 60 slides forwardly as a result of any forward momentum of the tractor 10, since it is connected to the draft unit 74 through the agency of the U-shaped bolt element 76. If the tractor 10 does not soon stop, the forward end of the spring 60 will strike the pin 66 which we have somewhat arbitrarily placed in those apertures 64 nearest the ears 36, 38. From this point on, those spring convolutions or coils forward of the U-shaped bolt 76 will absorb the transmitted load forces, thereby substantially moderating the shock that might otherwise occur. In this way, towing power is first removed from the plow 16, or whatever is being towed, yet a shock absorbing action is preserved if the tractor does not quickly come to a stop.

Describing now the somewhat simpler embodiment B, it might be explained at the outset that this hitch will find considerable utility in many instances. For example, behind the plow one might well wish to drag a pony drill press. The hitch B would possess especial utility when thus employed, for the hitch A would effectively remove the power drive. Actually, the two hitches A and B are basically the same, the salient difference being that the hitch now to be described does not possess the latch mechanism 86.

As shown in Figures 7 and 8 the modification denoted by the letter B comprises a first draft unit 130 corresponding to the earlier described unit 30, this unit 130 being composed of parallel draft members 132 and 134. Like in the embodiment A, the members 132, 134 are equipped with oppositely issuing ears 136, 138 at their forward ends. A pair of bolts 121 serve in this instance to couple the unit 130 to the drawbar or tongue of the pulled implement, which might be a pony press drill as already suggested, although many different trailers and the like could be towed with this multi-purpose hitch.

Several spacers 140 are utilized at intervals throughout the length of the unit 130, each being held in place by a bolt 142 and nut 144. Thus, a longitudinal slot 159 is provided.

Circumscribing the draft unit 130 is a coil spring 160, and for the purpose of stopping or anchoring this spring at preferred locations along the unit 130, a plurality of apertures 122 are provided in the members 132, 134. A transverse pin 123 is shown in one pair of aligned apertures adjacent one end of the spring 160. Another such pin 124 might well be inserted through those apertures immediately forward of the spring. A cluster of apertures 125, 126, 127, or any aligned pair of these apertures, might be added. However, the express function of these apertures, which of course have their aligned counterpart in both the members 132 and 134, is best left for discussion during the brief operational review to be given later.

Affixed to the spring 160 is a second draft unit 174, being held fast by means of a U-bolt 176. Instead of the clevis 73, the second unit here pictured is equipped with a downwardly projecting ball 128 co-operable with a socket member on the tractor or other towing vehicle.

As with the earlier embodiment it is contemplated that the present modification use spacer assemblies 162 identical to the assemblies 62. Each assembly is comprised of a small tubular member 164 welded to a spring convolution. Each tube 164 has an aperture extending therethrough for the reception of a through bolt 166 on which is threaded a nut 168. Square washers 170 are disposed at either end of each cylinder 164 and can be replaced when their side edges become worn from rubbing against the spaced draft members 132, 134 which form the slot 159 therebetween. These spacer assemblies 162, it may be stated once again, are identical to the ones labeled 62, it being more convenient from a drafting standpoint to detail such assemblies at this time because of the somewhat more simplified construction of the hitch B.

In operation, assuming that both of the pins 123 and 124 have been inserted in their respective apertures 122 as illustrated, a rightward pull, or pulling ahead, of the draft unit 174 will transmit a towing force to the unit 130 via the U-shaped bolt 176, the turns or convolutions ahead of the U-bolt and the pin 124. Should any obstruction be encountered, the spring section between the U-bolt 176 and the pin 124 will compress to absorb the shock. By the same token, when backing up or going the opposite way, those convolutions or coils between the U-bolt 176 and the aft pin 123 will shoulder the load, compressing if need be. Of course, if either set of apertures 122 farther to the left, as viewed in Figure 7, are selected for the accommodation of the pin 123, then there will be permitted a backward movement of the tractor until the slack has been removed, the turns then becoming compressed.

For a solid hitch connection in either a fore or aft direction, both pins 123, 124 can be removed from their depicted locations, one of them then being placed through the aligned apertures 126 of both the draft members 132 and 134. If a forward drive is taking place, the pull will be by way of the rear leg 180 of the U-shaped bolt 176, through that coil lying immediately forward of the leg 180, through the pin (whether it be 123 or 124) now in the apertures 126 to the unit 130. No resilient action is here provided. Similarly, when backing up, the force is transmitted from the unit 176 through the leg 182, the convolution immediately rearward thereof and the same pin which we have assumed for the moment to be in aperture 126. The same result can be achieved by inserting both pins 123, 124 in the apertures 125, 127 to either side of the apertures 126. On the other hand if a resilient forward operation is desired, but a solid reverse motion, then a pin would be positioned only in the apertures 125. Similarly, when a yieldable backing up is wanted, but a solid forward motion, a pin would be inserted in the aperture 127. Thus, it will be readily perceived, it is believed, that my hitch B in its depicted form is highly versatile and adaptable to a variety of situations. Although not fully shown, it is intended that various aperture combinations, such as those described in conjunction with hitch B, also be incorporated into hitch A.

The use of the U-bolts 76 and 176 in the two embodiments permits the number of effective coils or turns to be changed between the U-bolt and either end of the spring, thereby making the degree of cushioning action adjustable. To vary the number of coils forward or aft of the U-shaped bolt 76 or 176 the nuts 84 and 184 are loosened somewhat. Then the coil spring is rotated in the proper direction to advance or retract the spring. Stated somewhat differently, the spring 60 or 160 can be "threaded" relative to the lugs 79, 179 and the legs 80, 82, 180, 182, as the case may be. After the "threading" operation, the U-bolt nuts can be retightened to preserve the adjustment.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A resilient hitch comprising a first draft unit, a coil spring encircling said draft unit, a U-shaped element having its ends projecting outwardly between certain of the coils constituting said spring, said spring also encircling the bight of said U-shaped element, and a second draft unit connected to the projecting ends of said U-shaped element.

2. A resilient hitch in accordance with claim 1 in which said first draft unit is provided with a plurality of transverse apertures for the accommodation of a transverse pin at a selected location.

3. A resilient hitch comprising a first draft unit provided with a plurality of transverse apertures for the accommodation of a transverse pin at a selected location, a coil spring encircling said draft unit, at least one of said apertures being positionable between two adjacent spring coils, a U-shaped element spanning said adjacent coils and then projecting outwardly, a second draft unit connected to the projecting ends of said U-shaped element, whereby insertion of a pin into one aperture when so aligned provides a solid hitch drive in either direction.

4. A resilient hitch comprising a first draft unit provided with a slot extending along at least a longitudinal portion thereof, a coil spring freely encircling said draft unit, means carried by said first draft unit for limiting sliding movement of said spring therealong in opposite directions, a U-shaped element having its bight portion received in said slot and its leg portions projecting between certain of the coils constituting said spring, and a second draft unit fixedly connected to the leg portions of said U-shaped element.

5. A resilient hitch in accordance with claim 4 in which said certain coils constitute a pair of adjacent coils, said bight portion having a lug projecting between said adjacent coils with said leg portions residing to either side of said adjacent coils.

6. A resilient hitch comprising a pair of elongated draft members, means maintaining said draft members in a spaced parallel relationship with each other to form a first draft unit having a longitudinal slot, a coil spring freely encircling said draft unit so as to be slidable therealong, a U-shaped element having its bight portion received between said draft members so as to be guided thereby and its leg portions protruding between certain of the coils constituting said spring, and a second draft unit fixedly connected to said protruding leg portions of said U-shaped element.

7. A resilient hitch comprising a pair of elongated draft members having outturned flanges at one end, means maintaining said draft members in a spaced parallel relationship with each other to form a first draft unit having a longitudinal slot, a coil spring freely encircling said draft unit so as to be slidable therealong and arrestable in one extreme position by said outturned flanges, a plurality of spacer units each including a tubular element secured to a spring coil and including removable washers thereon which fit in said slot so as to assist in guiding said spring with respect to said first draft unit, a U-shaped element having its bight portion received between said draft members so as to be guided thereby and its leg portions protruding between certain of the coils constituting said spring, and a second draft unit fixedly connected to said protruding leg portions of said U-shaped element.

8. A resilient hitch in accordance with claim 7 in which said draft members have longitudinally spaced apertures for the accommodation of a transverse pin for arresting sliding movement of said spring.

9. A resilient hitch in accordance with claim 8 in which said U-shaped element spans two adjacent spring coils and said draft members are provided with additional apertures for the accommodation of a transverse pin therethrough when between said adjacent coils to provide a positive hitch drive in either direction.

10. A resilient hitch comprising a first draft unit, a coil spring encircling said draft unit, a U-shaped element having its ends projecting outwardly between certain of the coils constituting said spring, a second draft unit connected to the projecting ends of said U-shaped element, and a latch mechanism for releasing said coil spring from a preferred axial position relative to said first draft unit when a predetermined load is applied to said second draft unit, said latch mechanism including pivotal means carried by said first draft unit having one portion thereof normally in obstructive engagement with one end of said spring to retain said spring in said preferred axial position and a second portion in engagement with said second draft unit for transmission of said predetermined load from said second portion to said first portion to effect said release.

11. A resilient hitch in accordance with claim 10 in which said latch mechanism includes a member movable upon release of said coil spring for declutching the towing vehicle when such vehicle is connected to said second draft unit.

12. A resilient hitch comprising a first draft unit provided with a slot extending along at least a longitudinal portion thereof, a coil spring freely encircling said draft unit, a hasp member provided with a flange portion adjacent one end pivotally mounted in said slot nearer the rear end of said coil spring and a forwardly directed rod portion overlying said spring, the free end of said rod portion carrying a dog element engageable with the forward end of said spring, a U-shaped element having its bight portion received in said slot and its leg portions projecting between certain of the coils constituting said spring, a second draft unit fixedly connected to the leg portions of said U-shaped element having an opening at one end, said flange having a finger engageable in said opening so as to normally transmit a towing force from said second draft unit to said first draft unit via said hasp member until a predetermined load has been imposed on said hitch.

References Cited in the file of this patent

UNITED STATES PATENTS

| | | |
|---|---|---|
| 1,305,651 | Kaiser | June 3, 1919 |
| 1,309,368 | Rarig | July 8, 1919 |
| 1,356,076 | Litten | Oct. 19, 1920 |
| 1,838,499 | Robinson | Dec. 29, 1931 |
| 2,140,504 | Den Besten | Dec. 20, 1938 |
| 2,550,083 | Pazdernik | Apr. 24, 1951 |

FOREIGN PATENTS

| | | |
|---|---|---|
| 564,759 | France | Jan. 10, 1924 |